J. H. ANDREWS & J. W. BROSKI.
AUTOMOBILE WHEEL.
APPLICATION FILED MAR. 17, 1909.
991,045.
Patented May 2, 1911.
2 SHEETS—SHEET 1.
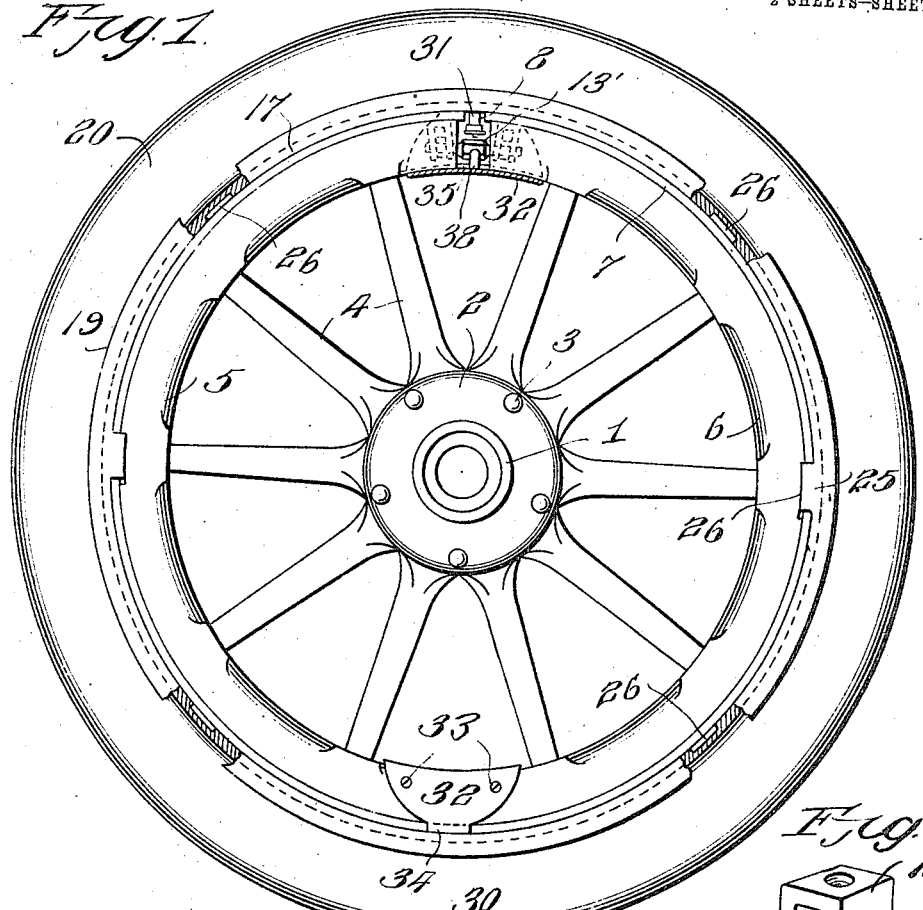
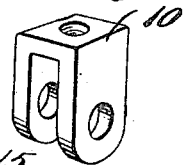
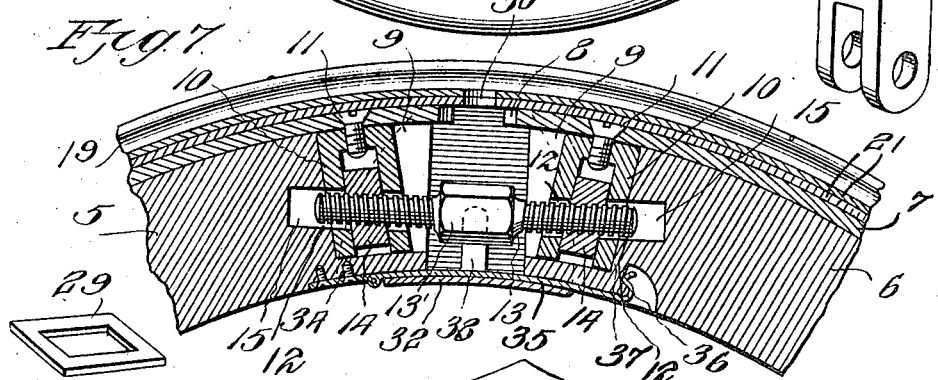
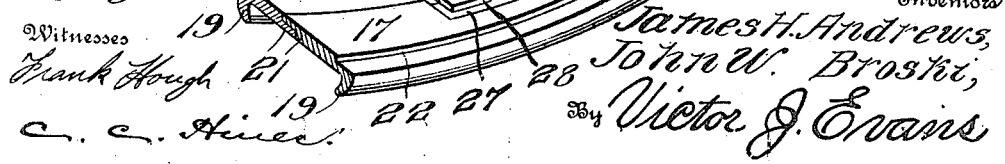
Witnesses
Frank Hough
C. C. Hines
Inventors
James H. Andrews,
John W. Broski,
By Victor J. Evans
Attorney

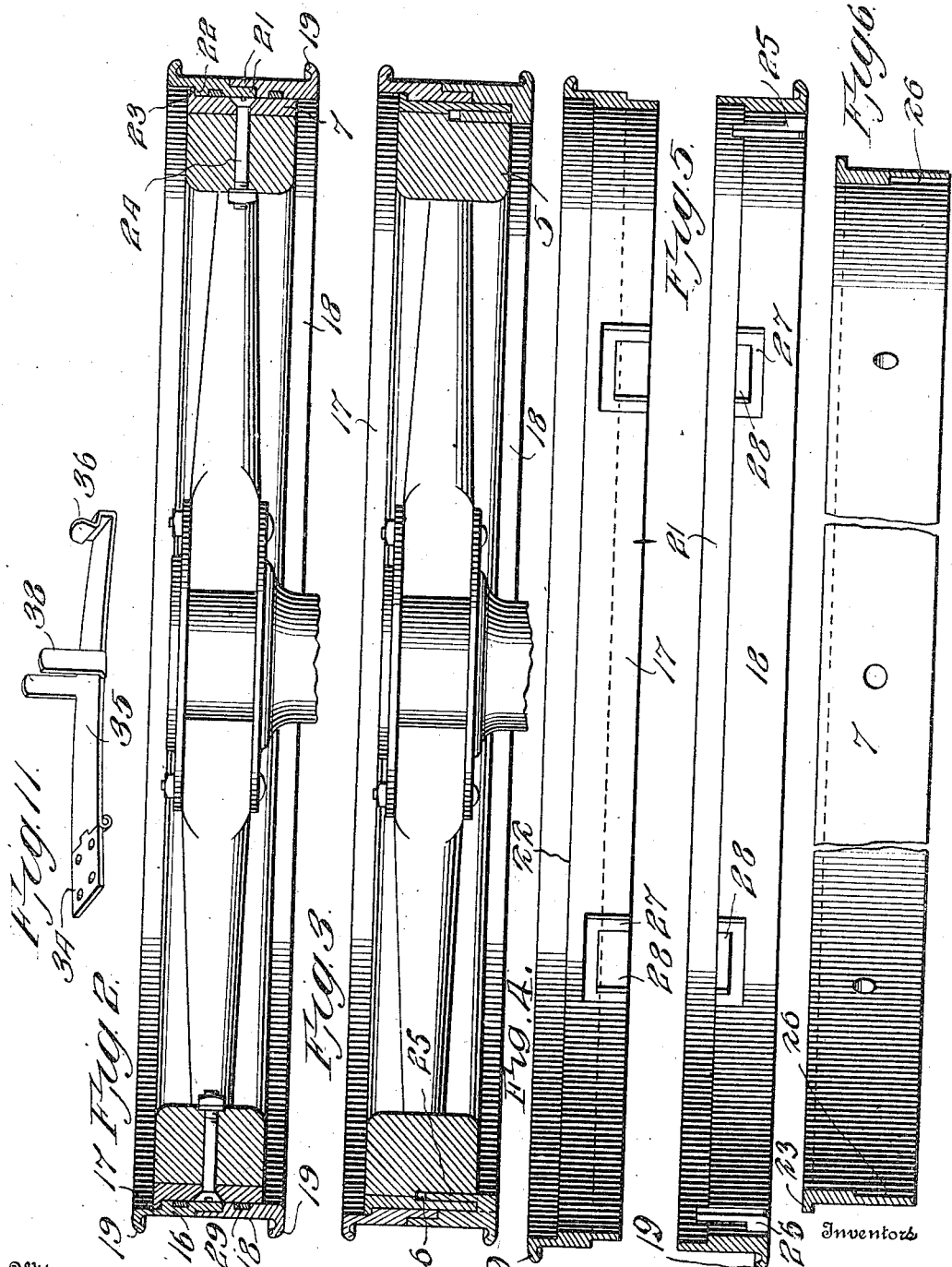

UNITED STATES PATENT OFFICE.

JAMES H. ANDREWS AND JOHN W. BROSKI, OF RICHMOND, VIRGINIA; SAID BROSKI ASSIGNOR OF ONE-EIGHTH OF HIS RIGHT TO CLAUDE B. DAVIS, OF RICHMOND, VIRGINIA.

AUTOMOBILE-WHEEL.

991,045. Specification of Letters Patent. Patented May 2, 1911.

Application filed March 17, 1909. Serial No. 483,882.

*To all whom it may concern:*

Be it known that we, JAMES H. ANDREWS and JOHN W. BROSKI, citizens of the United States, residing at Richmond, in the county of Henrico and State of Virginia, have invented new and useful Improvements in Automobile-Wheels, of which the following is a specification.

This invention relates to an improved construction of automobile wheel, the object of the invention being to provide a novel construction of sectional wheel with removable sectional rim and simple and effective fastening means therefor, by which a punctured or otherwise injured tire may be readily and conveniently removed and a new tire quickly substituted in its place and firmly secured in position without liability of injury to such new tire in the operation of applying the same.

The invention consists of the features of construction, combination and arrangement of parts hereinafter fully described and claimed, reference being had to the accompanying drawings, in which:—

Figure 1 is a side elevation, partially in section, of an automobile wheel embodying our invention. Figs. 2 and 3 are horizontal transverse sections thereof taken at different points through the wheel. Figs. 4 and 5 are similar views of the rim sections separated. Fig. 6 is a similar view of the reinforcing band. Fig. 7 is a longitudinal section through one of the joints of the felly with the rim applied. Fig. 8 is a perspective view of one of the U-shaped brackets. Fig. 9 is a perspective view of a portion of the rim, showing one of the sets of locking recesses and lugs in the rim sections. Fig. 10 is a perspective view of a locking plate to fit within said recess and engage said lugs. Fig. 11 is a perspective view of one of the devices for holding the adjusting screws from rotation.

Referring to the drawings, 1 designates the hub of the wheel, which may be of any suitable construction, and which embodies oppositely arranged clamping plates 2 united by bolts or rivets 3, and between which the inner ends of the spokes 4 are clamped, which ends of the spokes may also be secured directly to the hub in any preferred manner. The outer ends of the spokes are suitably connected with a felly which is composed of two or more sections 5 and 6, having their adjacent ends slightly spaced apart to admit of a determined amount of contraction and expansion thereof. To the outer surface of the felly is applied a strengthening band 7 which is split transversely at one point to form a slot 8 in alinement with one of the spaces between the ends of the felly sections at one side of the wheel and to adapt said band to contract and expand with the felly.

The ends of the felly at each point of division are formed with sockets or recesses 9, within which are seated U-shaped brackets 10 each secured to the overlying or adjacent portion of the band 7 by a screw or other suitable fastening 11 passing through its cross piece. The brackets are held from rotation in the sockets by making the latter of rectangular shape and are provided in their spaced arms or plates with openings 12 for the respective passage of the opposite ends of an adjusting screw 13, which ends of the screw are right and left threaded for coöperation with correspondingly threaded nuts 14 arranged within the brackets and held from rotation by the walls of the sockets, the inner ends of which latter are formed with recesses 15 communicating with the openings in the bracket plates for the passage of the ends of the screw when the felly is contracted. The central portion of the screw is formed with a rectangular head 13' arranged in the division space between the sockets, so that a wrench or other proper tool may be inserted into said space to turn the screw in one direction or the other for contraction or expansion of the felly.

A channeled rim 16 is provided to snugly fit the outer face of the plate 7, and is centrally divided circumferentially to form a pair of counterpart sections 17 and 18 each having at its outer edge a hooked flange or bead 19 to receive and engage coacting retaining flanges on the pneumatic tire 20, which seats within the channel of the rim formed by said hooked flanges or beads. The rim sections are provided at their inner edges with reduced flanges 21 forming a lap joint, and the rim section 17 is formed at its outer side with a shoulder 22 to engage an annular retaining flange or lip 23 formed on one side of the band 7, for a purpose hereinafter described, which band is secured at intervals to the felly by fastening bolts 24 having their heads countersunk in the face of the band to allow the rim to abut squarely against the same. The rim sections are adapted to be applied to the body of the wheel when the latter is in a contracted condition and to be held against displacement therefrom by the expansion of said body to institute a proper degree of frictional binding action.

In order to admit of the ready and proper application of the rim sections to the felly so that certain portions thereof will be disposed in registering relation, one of said rim sections—the rim section 18 in the present instance, is provided at intervals around its circumference with inwardly projecting retaining tongues or fingers 25 to enter transverse recesses 26 formed conjointly in the outer surfaces of the felly sections and the inner face of the band 7, said tongues or fingers also serving to hold the said rim section against circumferential movement on the felly and thus prevent the same from slipping. The inner faces of the rim sections are also provided at suitable intervals with matching U-shaped recesses 27 opening through their inner edges and coacting to form a seat or socket, and within each of said recesses is arranged a retaining lug or projection 28. When the rim sections are assembled, the lugs of each set abut and the recesses register to provide a rectangular socket at the center of which the lugs are disposed. An open rectangular locking plate 29 is provided to seat within each socket so formed and receive the lugs 28 which fit within the opening therein. The locking plates lie flush when applied within a surface of the rim and bear against the band 7 by which they are held in position, and they thus serve to prevent relative lateral or transverse movement and disconnection of the rim sections and also coact with the tongues or fingers 25 to prevent circumferential movement thereof on the felly.

In the application of the rim and tire to the wheel, the rim sections are first assembled and the tire seated within the channel thereof, the locking plates 29 inserted within their receiving sockets in which they are frictionally held, the rim arranged on the side of the band 7 opposite that on which the lip 23 is formed and with the tongues or fingers 25 in registry with the recesses 26 at that side of the wheel, and then the rim is slid laterally across the band 7 until the shoulder 22 engages the lip 23. In this operation, of course, the felly is in a contracted condition through the proper prior adjustment of the screws 13, which, as soon as the rim is fully seated in position, are reversely adjusted to expand the felly and thus clamp the rim and tire firmly and securely in position. In order to remove a punctured or defective tire, it will be understood that it is simply necessary to contract the felly, whereupon the rim and tire may be easily and expeditiously slipped off.

The slotted portion 8 of the band 7 faces one of the sets of sockets 9 and registers with alined openings 30 formed in the rim sections, through which openings and the slot in the band the valved inflating tube 31 of the tire is designed to extend into the space between the sockets, to provide for its proper protection from injury and enable it to be conveniently reached when it is necessary to inflate the tire. In practice, however, the tire is preferably inflated upon the rim before the latter is applied to the felly, so as to avoid the necessity of inflation after application unless the tire becomes deflated through leakage and it is necessary to inflate the same while in position for emergency use.

A substantially U-shaped clip or cover plate 32 is provided to close the space between each respective set of socketed ends of the felly sections and to protect the coacting adjusting screw and associated parts from dust and dirt and the action of the elements. The bight portion of this clip or cover plate fits against the inner faces of the felly ends, while the side pieces or plates thereof, which preferably taper toward their free ends, cover the opposite sides of the felly ends and are preferably secured thereto by screws or other suitable fastening devices 33, and the said free ends of said side pieces or plates are provided with extensions 34 to bear against the rim sections and close the sides of the slot 8 in the band 7. It will be understood from the foregoing description that in order to inflate the tire while on the wheel, it is simply necessary to remove the adjacent cover plate, while in contracting or expanding the felly both cover plates are detached for adjustment of the screws to secure a uniform degree of expansion and contraction.

By means of our improved construction of wheel, provision is made for the ready and quick application and removal of the tire and its firm retention in position without the use of fastening devices of a character liable to weaken the wheel. In the application of a new tire in place of a punctured or otherwise injured tire in use, it will be understood that the rim and tire may be detached from the wheel, the old tire removed from the rim and a new tire seated upon the rim and applied with the latter to the wheel, but, if desired, a vehicle may be equipped with extra rims having tires applied thereto, so that a new tire may be quickly applied to take the place of an old one without the necessity of going to the time and trouble of detaching the old tire from its rim.

If desired, a device, such as shown in detail in Fig. 11, may be employed to hold each adjusting screw from rotation. This device comprises an attaching plate 34 secured to the inner face of the felly, to which plate is hinged at one end a locking plate 35 extending across the inner side of the slot in the felly between the latter and the bight of the clip 32 and provided at its free end with a spring catch 36 to interlock with a shoulder 37 on the felly. This plate 35. carries a pair of fingers 38 which project on opposite sides of the head 13' of the screw 13 to hold the latter from turning in either direction. Upon detaching the clip 32 the locking plate may be swung outward to withdraw the fingers 38 and allow the screw to be turned.

Having thus fully described the invention, what is claimed as new, is:—

1. In a vehicle wheel, a demountable rim comprising a pair of circumferentially divided sections, said sections having their inner faces provided at suitable intervals with substantially U-shaped recesses opening through their inner edges and lugs within said recesses and coacting therewith to form a rectangular socket surrounding said lugs, and an open rectangular locking plate adapted to seat within said socket and to receive said lugs to connect the rim sections against relative lateral and circumferential movements.

2. In a vehicle wheel, an expansible felly having transverse sockets, means for expanding and contracting said felly, and a rim adapted to be held upon the felly by frictional engagement therewith when said felly is expanded and to be released for removal when said felly is contracted, said rim having transverse tongues to interlock with said transverse sockets.

3. The combination in a vehicle wheel, of a felly, having a shoulder at one side and inwardly extending transverse sockets at its opposite side, a rim slidably applicable and removable from the latter-named side of the felly, said rim having a shoulder thereon at one side to engage the shoulder on the felly and a series of transverse tongues extending inwardly from its opposite side to engage said transverse sockets in the felly, and means for holding the rim against lateral movement toward the side of the felly from which it is applied, whereby upon the release of said holding means the rim may be slidably withdrawn from the felly.

4. A wheel having a divided felly formed with sockets in the ends of the sections thereof, U-shaped bracket plates mounted in said sockets and having openings in the arms thereof, non-rotatable nuts held between the arms of the bracket plates, right and left hand adjusting screws passing through the openings in the bracket plates and engaging the nuts for coaction therewith to expand and contract the felly, a removable rim upon the felly and adapted to be held thereon by the expansion thereof, and a tire carried by said rim.

5. A wheel having a divided felly formed with sockets in the ends of the sections thereof, U-shaped bracket plates mounted in said sockets and having openings in the arms thereof, non-rotatable nuts held between the arms of the bracket plates, right and left hand adjusting screws passing through the openings in the bracket plates and engaging the nuts for coaction therewith to expand and contract the felly, covers for closing the spaces between the ends of the felly, means coacting therewith to hold the adjusting screws from rotation, a removable rim upon the felly adapted to be held thereon by the expansion thereof, and a tire carried by said rim.

6. A wheel having a divided felly formed with sockets in the ends of the sections thereof, U-shaped bracket plates mounted in said sockets and having openings in the arms thereof, non-rotatable nuts held between the arms of the bracket plates, right and left hand adjusting screws passing through the openings in the bracket plates and engaging the nuts for coaction therewith to expand and contract the felly, covers for closing the spaces between the ends of the felly, a movable detent having fingers to engage and hold the screw from rotation, a removable rim upon the felly adapted to be held thereon by the expansion thereof, and a tire carried by said rim.

7. The combination with a vehicle wheel having a contractible and expansible felly, said felly having spaced ends, of an adjusting screw having reverse threaded engagement with said ends for expanding and contracting said felly, a cover plate closing the space between the felly ends at each side thereof, and a retaining plate pivoted to the felly and adapted to interlock therewith and provided with fingers arranged to engage the screw to hold it from rotation.

In testimony whereof, we affix our signatures in presence of two witnesses.

JAMES H. ANDREWS.
JOHN W. BROSKI.

Witnesses:
J. T. POINDEXTER,
A. C. PORTER.

---

Copies of this patent may be obtained for five cents each, by addressing the "Commissioner of Patents, Washington, D. C."